United States Patent [19]

Danna et al.

[11] Patent Number: 4,853,774
[45] Date of Patent: Aug. 1, 1989

[54] AUXILIARY LIGHT APPARATUS FOR BORESCOPE

[75] Inventors: Dominick A. Danna, Syracuse; Jon Salvati, Skaneateles; Joseph A. Ciarlei, Marcellus, all of N.Y.

[73] Assignee: Welch Allyn, Inc., Skaneateles Falls, N.Y.

[21] Appl. No.: 264,257

[22] Filed: Oct. 28, 1988

[51] Int. Cl.⁴ .......................... H04N 7/18; A61B 1/04
[52] U.S. Cl. ...................................... 358/98; 358/100; 128/6
[58] Field of Search ................. 358/98, 229, 210, 901, 358/93, 100; 128/4, 6

[56] References Cited

U.S. PATENT DOCUMENTS

| | | | |
|---|---|---|---|
| 4,475,539 | 10/1984 | Konomura | 358/98 |
| 4,491,365 | 1/1985 | Danna et al. | 358/98 |
| 4,523,224 | 6/1985 | Longacre et al. | 358/42 |
| 4,539,586 | 9/1985 | Danna et al. | 358/98 |
| 4,546,379 | 10/1985 | Sarofeen et al. | 358/42 |
| 4,601,284 | 7/1986 | Arakawa et al. | 358/98 X |
| 4,621,618 | 11/1986 | Omagiri | 358/98 |
| 4,755,873 | 7/1988 | Kobayashi | 358/98 |

Primary Examiner—James J. Groody
Assistant Examiner—Victor R. Kostak
Attorney, Agent, or Firm—Wall and Roehrig

[57] ABSTRACT

An auxiliary light apparatus for a color video borescope has an auxiliary box that is connected by an umbilical to a receptacle on the video processor unit for the borescope. The insertion tube of the borescope has an interface module which normally connects to a receptacle in the video processor, but also fits a receptacle in the auxiliary box. A sequential primary color illumination is generated in the auxiliary box and supplied through the interface module and a fiber optic bundle in the insertion tube to the distal end of the tube to illuminate a remote target area.

4 Claims, 3 Drawing Sheets

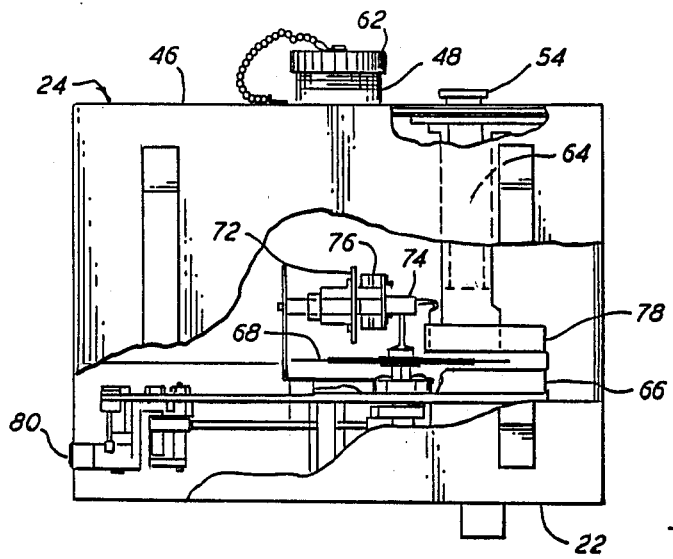
_FIG. 3_
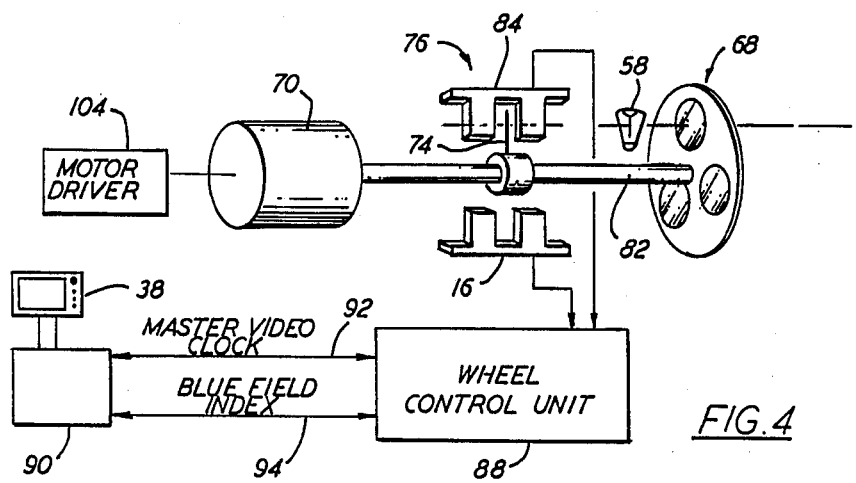
_FIG. 4_
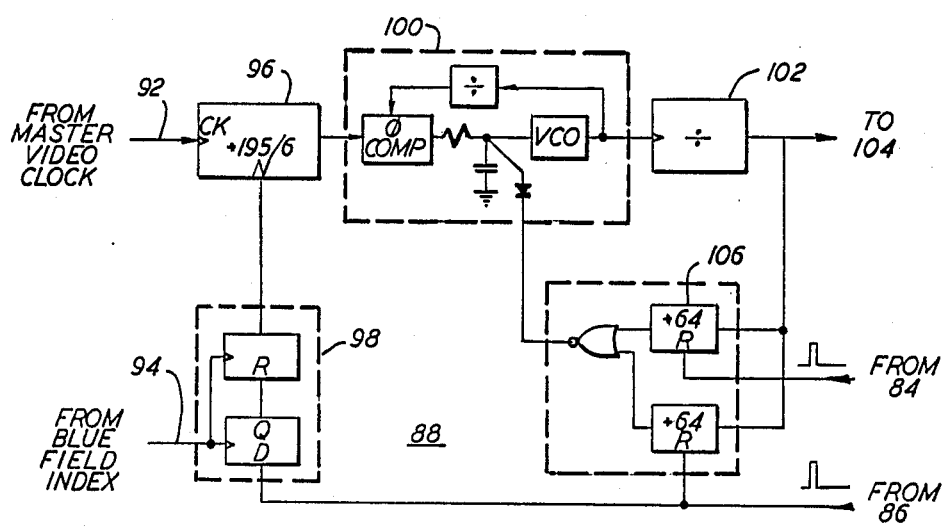
_FIG. 5_

AUXILIARY LIGHT APPARATUS FOR BORESCOPE

BACKGROUND OF THE INVENTION

This invention relates to endoscopes or borescopes of the type in which a miniature video camera is mounted at the end of a flexible elongated insertion tube, and in which illumination is carried on a fiber optic bundle to the distal end of the insertion tube to illuminate a remote target area.

The invention is more particularly concerned with apparatus to extend the range of the borescope or endoscope, that is, devices which increase the separation from the target area to the borescope's video processor unit.

Currently, video borescopes are limited in length to about fifty feet (sixteen meters). This distance represents the maximum effective distance that the fiber optic bundle in the insertion tube can carry illumination for illuminating the target area. As a result, it is sometimes necessary to place the video processor in a precarious or highly inconvenient location just to permit the borescope to reach a desired remote target area, which may be deep within a turbine, boiler, or other complex piece of equipment.

Where a color endoscope or borescope is employed, sequential primary color light is supplied over the fiber optic bundle to illuminate the target area sequentially with red, blue, and green light. This can be generated using a white light source and separated into primary colors with a color filter wheel, whose rotation speed and phase are synchronized with the field rate of the video signal produced by the video camera. A sequential color light wheel device of this type is disclosed in Longacre U.S. Pat. No. 4,523,224. This device is conventionally contained within the video processor unit of the endoscope or borescope system.

An interface module at the proximal end of the borescope insertion tube, or at the proximal end of an umbilical or extension coupled to the insertion tube, removably couples to the video processor unit. This interface module includes electrical connectors to connect the video camera to circuitry in the video processor. The interface module also includes an optical interface that couples the proximal end of the fiber optic bundle to the sequential color light source within the video processor unit. An interface module of this type is disclosed in Danna et al. U.S. Pat. No. 4,539,586.

OBJECTS AND SUMMARY OF THE INVENTION

It is an object of this invention to provide apparatus that extends the range of a borescope, or endoscope, without degradation of illumination, and without affecting the video signal produced by the video camera or imager in the device.

It is another object of the invention to provide apparatus which can be inserted between the endoscope or borescope's interface module and the socket or receptacle therefor in the video processor.

It is yet another object of the invention to extend the borescope or endoscope range with only minor modification to the existing video processor.

According to an aspect of the invention, auxiliary illumination apparatus for a borescope to extend its range or working distance comprises a housing, a receptacle in the housing to receive the borescope interface module, a multiple contact connector mounted on the housing, and an electrical wiring harness within the housing with connectors to connect the pins or contacts of the interface module with corresponding pins of the multiple contact connector. An illumination source is situated within the housing with an optical interface disposed at the receptacle for supplying suitable illumination through the fiber optic bundle to the target area at the distal end of the borescope insertion tube. Preferably, this illumination source includes a color filter wheel and suitable control electronics within the housing. A flexible liquid light conduit, or the like, brings the light from the external source to the color wheel. The illumination fed to the fiber optic bundle is a sequence of primary colors which are synchronized, e.g., with the blue fields of the video signal.

An umbilical connects this auxiliary apparatus to the video processor unit, and permits the auxiliary apparatus to be remoted from it a desired amount. The umbilical includes a sheath that carries a number of conductors, and a distal end connector which contacts these conductors with respective pins or contacts of the multiple contact connector. At the proximal end of the umbilical is an auxiliary interface module that mates with the receptacle in the video processor unit. This connects the appropriate conductors to send power, synchronizing signals and auxiliary signals to the video camera in the borescope, and to receive the video signals from it. To bring the appropriate power and synchronizing signals (e.g., the blue field pulses) to the color filter wheel circuitry, an additional coupler and a branch are situated at the proximal end of the umbilical. A corresponding coupler is installed on the video processor for this purpose, and the lamp and color filter wheel in the video processor can be disabled, each with a rather simple, straightforward modification. The video and electrical signals are passed straight through the umbilical and apparatus, but the sequential primary color light is generated in the auxiliary apparatus.

The above and many other objects, features, and advantages of this invention will become more fully understood from the ensuing description of a preferred embodiment which should be read in connection with the accompanying Drawing.

BRIEF DESCRIPTION OF THE DRAWING

FIG. 3 is a top plan view of the apparatus with a portion of the housing removed.

FIG. 4 is a schematic view of the color filter wheel of the apparatus of this embodiment.

FIG. 5 is a schematic circuit diagram of synchronization and control circuit of this embodiment.

DETAILED DESCRIPTION OF THE PREFERRED EMBODIMENT

Figure 1:
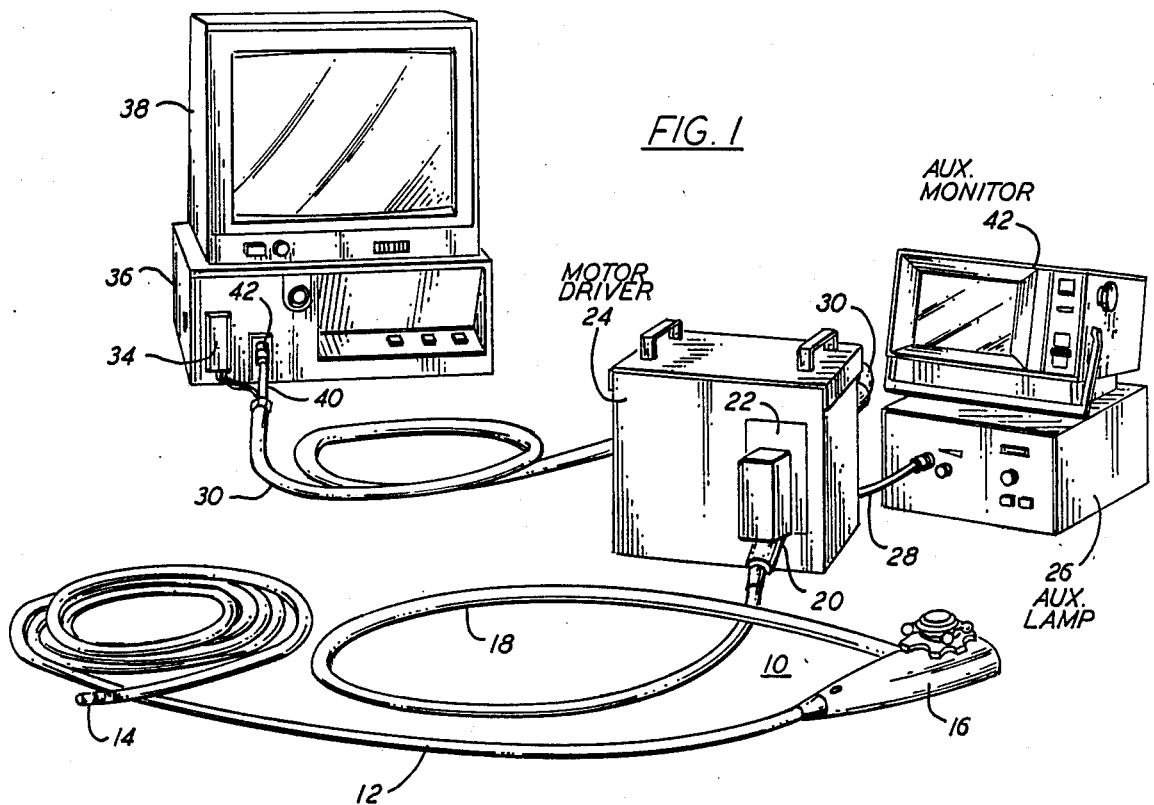
FIG. 1 is a perspective assembly view of a borescope with auxiliary illuminating apparatus according to one embodiment of this invention.

With reference to the Drawing, FIG. 1 shows a video borescope assembly which comprises a borescope 10 having an elongated, flexible insertion tube 12 approximately fifty feet (sixteen meters) in length and which has a viewing head 14 incorporated into its distal end.

This viewing head contains optical lenses and a miniature camera. The latter can be formed of a C.C.D. device or other solid state imager capable of providing a full-color image of a remote target area, e.g. the inside of a boiler tube of a heat exchanger, or a stator vane of a turbine. An example of a suitable solid state imager is disclosed in U.S. Pat. No. 4,491,865.

At the proximal end of the insertion tube is a steering and control unit 16 which couples the insertion tube 12 to a flexible tubular umbilical or extension 18. At the proximal end of the umbilical 18 is a borescope interface module 20 of the plug-in type, substantially as disclosed in U.S. Pat. No. 4,539,586, which fits a mating receptacle 22 in an auxiliary light box 24. This light box is coupled in turn to an auxiliary illumination source 26 by means of a suitable flexible light guide 28. In this case the light guide 28 is a liquid light guide. An auxiliary umbilical 30, which is a flexible sheath containing a plurality of conductors, extends from a rear side 32 of the auxiliary light box 24 and has an auxiliary interface module 34 that fits a receptacle on a video processor unit 36.

The auxiliary interface module 34 is structurally and functionally similar to the borescope interface module 20, and serves to connect corresponding conductors in the borescope insertion tube 12 to the video processor unit 36. This permits the latter to provide video signals to a video monitor or screen 38 to produce an image of the remote target area.

An auxiliary plug connector 40 at the proximal end of the umbilical 30 fits an auxiliary connector socket 42 on the video processor unit 36. Connector 40 brings power and video synchronizing signals to the auxiliary light box to synchronize a primary color sequential filter wheel to be discussed later. Also as shown in FIG. 1, an auxiliary video monitor can be remoted to the location of the auxiliary light box, if desired.

The borescope insertion tube has a wire bundle within it to carry video signals, synchronizing signals, power and auxiliary signals between the video processor unit 36 and the imager of the viewing head 14. Also, there is a fiber optic bundle extending through the insertion tube 12 and umbilical 18 to carry illumination from a sequential primary color generator in the video processor unit 36 to the distal tip of the borescope insertion tube 12 to illuminate the target area. Because of intrinsic characteristics of this fiber optic bundle, the insertion tube is limited to a maximum length of fifty feet. Beyond that distance, transmission losses in the bundle prevent sufficient illumination to obtain a clear color video signal.

The interfacing of the fiber optic bundle to the color illumination generator is carried out by the interface module 20, such as the one as explained in U.S. Pat. No. 4,539,586.

Inspection of equipment with this type of borescope becomes difficult for confined areas, such as a boiler manifold, where there is insufficient space for the video processor unit. In such case, the auxiliary light unit 26 can be employed to remote the video processor unit by several meters.

Figure 2:
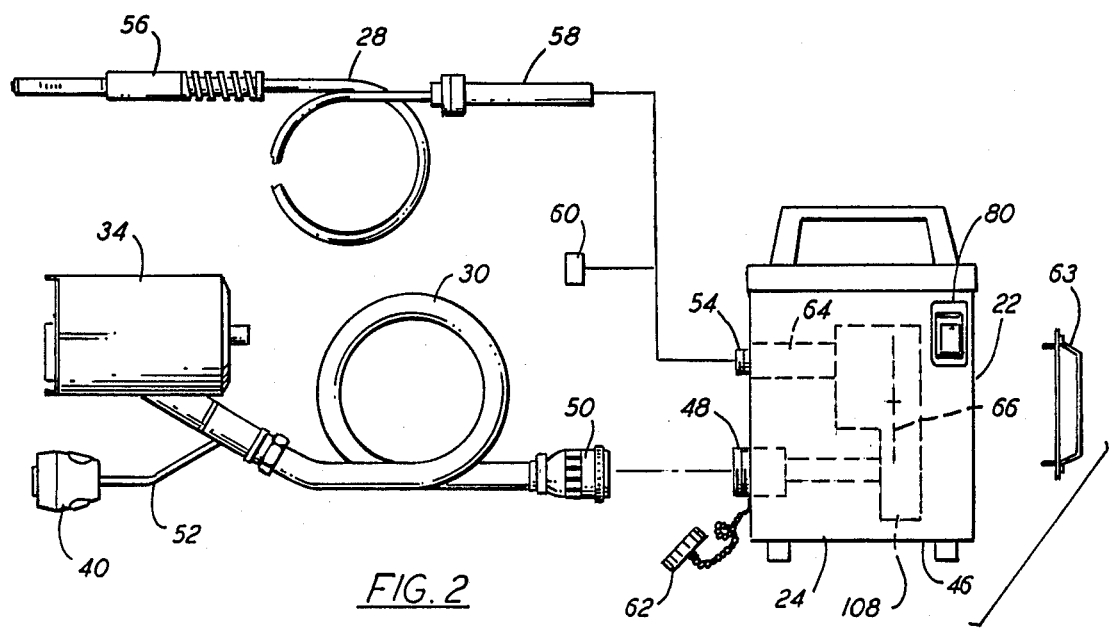
FIG. 2 is a partly exploded side view of the apparatus of this embodiment.

As shown in FIG. 2, the auxiliary light box 24 is formed of a housing or case 46 with a multiple-pin connector 48 mounted on its rear wall 32. This connects with a mating multiple contact connector 50 on the distal end of the auxiliary umbilical 30. A branch 52 at the proximal end of the umbilical 30 reaches to the auxiliary plug connector 40.

A receptacle 54 for the light conduit 28 is also located on the rear wall 32 of the auxiliary box 24.

The light guide or conduit 28 has a male fitting 56 at its proximal end to connect to a suitable fitting at the auxiliary lamp unit 26. An adapter can be employed to mate this fitting to other light sources. At the distal end of the light guide 28 is a male coupling or probe 58 which is inserted into the receptacle 54 on the auxiliary box 24, protruding to a position adjacent the receptacle 22. A retaining nut 60 with inside threads retains the probe 58 in the receptacle 54. A dust cap 62 is provided for the multiple pin connector 48 and a dust cover 63 is provided for the receptacle 22.

As further shown in FIG. 3, the housing 46 of the auxiliary box 24 has a sleeve 64 within it connected to the receptacle 54 to guide the light guide probe 58 to a suitable position with respect to a color generator 66, which can be of the same general construction as disclosed in U.S. Pat. No. 4,523,224. This generator includes a rotary color filter wheel 68 which presents a succession of red, blue, and green filters between the end of the probe 58 and the receptacle 22. A synchronous motor or stepper motor 70 drives the color filter wheel 68 in synchronism with a synchronizing signal in the video signal, e.g., the blue field vertical synchronizing signal. Synchronizing signals are generated in the video processor unit; accordingly, the box 24 can be used for either NTSC or PAL systems, as preferred.

As also shown in FIG. 4, the color generator includes a motor driver circuit printed circuit board 72. A timing pin 74 on the shaft of the motor 70 passes a magnetic or optical sensor 76 which produces a pulse when the motor shaft reaches a predetermined angular position. The color generator also includes suitable interface optics 78, and a color/monochrome selector which can be as described in co-pending U.S. patent application Ser. No. 221,776, having a common assignee herewith.

As shown in more detail in FIG. 4 the timing pin 74 is mounted on a shaft 82 of the motor 70 to rotate with the color wheel 68. The rotary position sensor 76 here includes a first optical sensor 84 and a second optical sensor 86 angularly spaced by 180 degrees. These sensors provide position pulses that are phase separated from one another by 180 degrees.

On the motor driver circuit board 72 a wheel control unit 88 sends motor drive control signals in response to the position pulses from the sensors 84 and 86, in response to clock pulses from a master video clock pulse 92, and in response to a blue-field vertical synchronizing signal 94 which are produced in a video signal generating circuit 90 that is located in the video processor unit.

As illustrated in FIG. 5, the wheel control unit 88 has a frequency divider 96 that receives the master video clock pulses, and a control input N to control whether the divisor is 195 or 196. The blue field synchronizing signal 94 is furnished to a blue field index circuit 98 that is also furnished with the position pulse from the sensor 86, and this circuit 98 sends a control signal to the divider 96.

The frequency divider 96 has an output that controls a phase-locked loop 100 to produce an output that passes to a divider 102 which sends a control signal to a motor drive circuit 104 (FIG. 4) that powers the stepper motor 70.

The position pulses from the sensors 84 and 86 are also supplied to a logic circuit 106 which consists of a pair of dividers and a NOR gate. These dividers are clocked by the output of the divider 102 and reset by the position pulses, while the NOR gate output is furnished to a VCO input of the phaselocked loop 100. The details of operation of this circuit can be understood by reference to U.S. Pat. No. 4,523,224.

Figure 6:
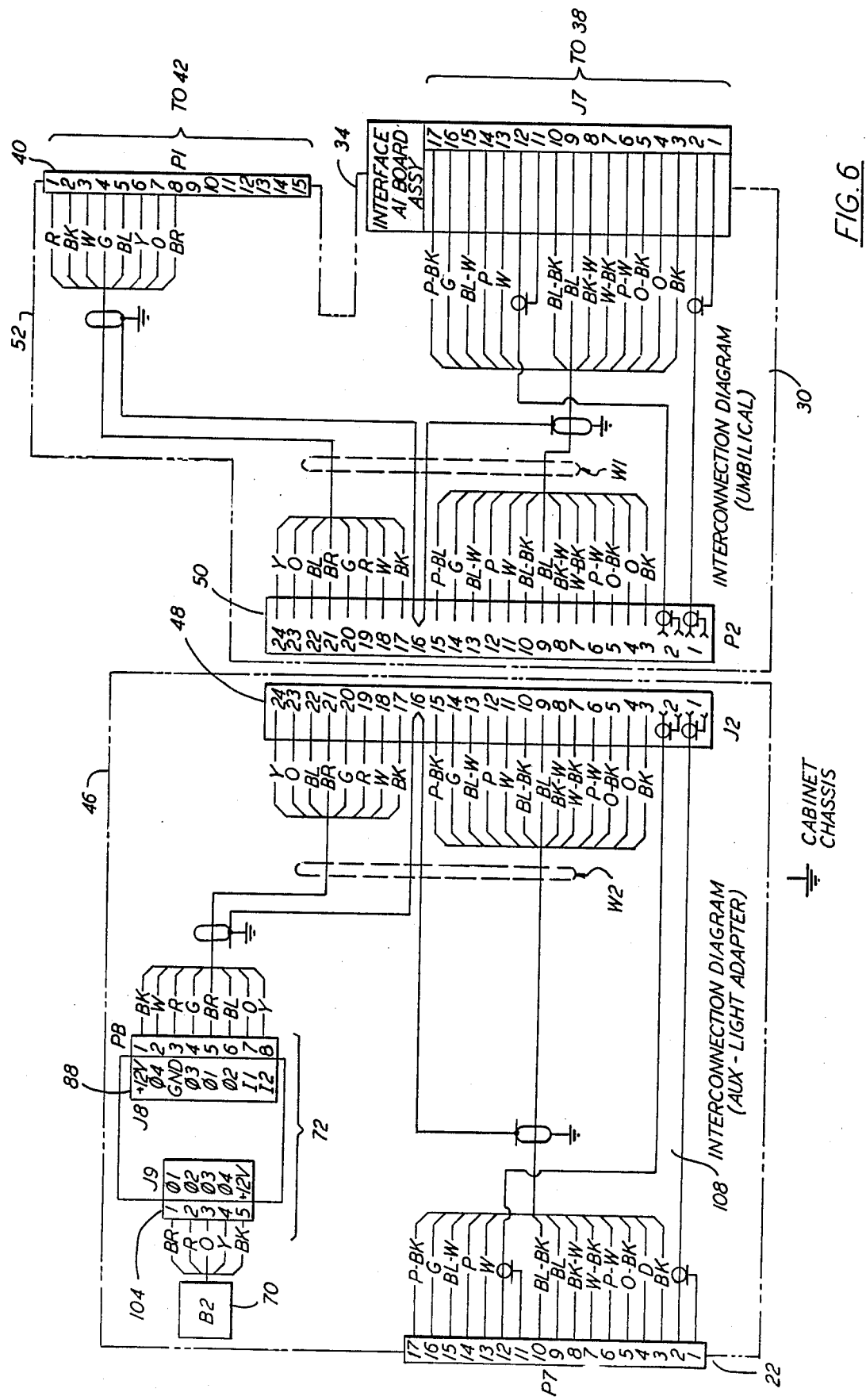
FIG. 6 is a wiring chart illustrating the connectivity of the apparatus and umbilical.

Within the enclosure 46 of the auxiliary box 24 is a wiring harness 108 as shown schematically in FIG. 6. This harness 108 has a plurality of conductors which connect the receptacle 22 directly to the multiple pin connector 48, for connection via the connector 50, auxiliary umbilical 30 and auxiliary interface module 34, to the video processor unit 36 which are also shown schematically in FIG. 6. The auxiliary socket 42 on the video processor 36 supplies signals and power through the plug connector 40, branch 52, connectors 50,48 and a portion of the wiring harness 108 to the motor driver circuit board 72.

The apparatus of this embodiment provides straight passthrough of electrical signals between the borescope imager and the video processor unit. However, the color sequential illumination is generated in the box 24 at a distance from the unit 36. This permits the monitor 38 and video processor unit 36 to be remoted at a desired location away from the target area without exceeding the critical limit mentioned earlier.

The minor modification to the video processor unit, i.e., adding the connector 42 and associated wiring internal to the unit 36, can be easily carried out. The internal color wheel and lamp unit within the video processor unit should be disabled when the auxiliary system of this invention is employed.

Also, while this invention has been employed with a borescope in this example, the same or similar system could be employed with a medical or veterinary endoscope, if desired.

Although this invention has been described with reference to one particular embodiment, it should be recognized the invention is not limited to that embodiment. Rather, many modifications and variations would present themselves to those of skill in the art without departing from the scope and spirit of this invention, as defined in the appended claims.

What is claimed is:

1. Auxiliary illumination apparatus for extending the working distance between a remote target area and a video processor unit for a video borescope or endoscope of the type which includes an elongated flexible insertion tube, a video camera disposed at a distal end of the insertion tube, an interface module coupled to a proximal end of said insertion tube for connecting to a mating receptacle coupler in said video processor unit for supplying power, synchronizing signals, and auxiliary signals from said video processor device to said video camera and to receive and process video signals produced by said video camera, and further including an optical interface for coupling an illumination source in said video processor unit to a proximal end of a fiber optic bundle within said insertion tube which carries illumination to the distal end of said insertion tube to illuminate said target area; said auxiliary apparatus comprising a housing;
receptacle means in said housing for receiving said interface module;
a multiple contact connector mounted on said housing;
electrical harness means within the housing including a plurality of conductors at least certain ones of which terminate at said receptacle means and also terminate at said multiple contact connector;
an illumination generating device within said housing including an optical interface disposed at said receptacle means for supplying illumination through said fiber optic bundle to said target area; and
an umbilical which includes a flexible elongated sheath, a plurality of conductors within said sheath, a distal end connector which mates with said multiple contact connector to couple said plurality of conductors to said electrical harness means, an auxiliary interface module at a proximal end of said umbilical which mates with said mating receptacle coupler in said video processor unit and connected to at least certain predetermined conductors of said plurality of conductors for providing power synchronizing signals, and auxiliary signals over said conductors and through said electrical harness and said insertion tube to said camera and to carry the video signals from said camera to said video processor unit.

2. An auxiliary illumination apparatus according to claim 1, wherein said illumination generating device includes means for sequentially generating primary color illumination, and means synchronizing the sequential illumination with a field rate of said video signal.

3. An auxiliary illumination apparatus according to claim 2, wherein said umbilical includes an additional coupler with contacts connected to predetermined ones of the conductors in said umbilical, and connecting with a mating coupler in said video processor unit, said predetermined conductors being connected through associated conductors in said electrical harness to a synchronizing input of said illumination generating control the synchronization of said sequentially generated primary color illumination.

4. An auxiliary illumination apparatus according to claim 1 wherein said illumination device includes an external lamp unit, a flexible optical conduit having a proximal end coupled to said lamp unit to receive the illumination therefrom, a socket in said housing which mates with a distal end of said flexible optical conduit, and means within said housing which receives the illumination from said conduit and transmits it to said fiber optic bundle.

* * * * *

UNITED STATES PATENT AND TRADEMARK OFFICE
CERTIFICATE OF CORRECTION

PATENT NO.   : 4,853,774
DATED        : August 1, 1989
INVENTOR(S)  : Dominick Danna et al.

It is certified that error appears in the above-identified patent and that said Letters Patent is hereby corrected as shown below:

Col. 6, line 45, after "generating" insert --device to bring field rate synchronizing signals thereto to--

Signed and Sealed this

Twenty-first Day of August, 1990

*Attest:*

HARRY F. MANBECK, JR.

*Attesting Officer*     *Commissioner of Patents and Trademarks*